US008590568B2

(12) United States Patent
Tiberghien et al.

(10) Patent No.: US 8,590,568 B2
(45) Date of Patent: Nov. 26, 2013

(54) FEMALE QUICK-CONNECT COUPLING ELEMENT, AND A QUICK-CONNECT COUPLING INCORPORATING SUCH AN ELEMENT

(75) Inventors: Alain-Christophe Tiberghien, Sevrier (FR); Olivier Pastore, Ugine (FR)

(73) Assignee: Staubli Faverges, Faverges (FR)

( * ) Notice: Subject to any disclaimer, the term of this patent is extended or adjusted under 35 U.S.C. 154(b) by 464 days.

(21) Appl. No.: 12/891,113

(22) Filed: Sep. 27, 2010

(65) Prior Publication Data

US 2011/0079306 A1 Apr. 7, 2011

(30) Foreign Application Priority Data

Oct. 1, 2009 (FR) ...................................... 09 56861

(51) Int. Cl.
*F16L 37/12* (2006.01)
(52) U.S. Cl.
USPC .......................................... 137/614; 251/149
(58) Field of Classification Search
USPC .......... 137/614–614.06, 798; 251/149, 149.1, 251/149.6, 149.8, 149.9; 141/383
See application file for complete search history.

(56) References Cited

U.S. PATENT DOCUMENTS

| 4,552,333 | A | 11/1985 | Niemi |
| 5,095,947 | A * | 3/1992 | Weh et al. ................ 137/614.06 |
| 6,343,630 | B1 | 2/2002 | Dubinsky |
| 6,830,059 | B1 | 12/2004 | Zeiber |
| 2008/0011369 | A1 | 1/2008 | Matsumoto |

FOREIGN PATENT DOCUMENTS

EP 1596119 A1 11/2005

* cited by examiner

*Primary Examiner* — John K Fristoe, Jr.
*Assistant Examiner* — Craig J Price
(74) *Attorney, Agent, or Firm* — Dowell & Dowell, PC (57) ABSTRACT

A female quick-connect coupling element for releasably joining pipes for pressurized fluid which receives, along a longitudinal axis, an end-piece of a male element, and has at least one locking member for locking the male element, and which includes a fluid flow duct and a valve for controlling the flow of fluid through the flow duct, which valve includes a movable piston element mounted to move relative to a seat, and wherein the female element also includes a discharge circuit for discharging fluid from the flow duct downstream from the valve seat and the flow duct including a hollow end-piece for bearing against a seal carried by a male element when fitted into the female element, and wherein the hollow end-piece includes an inner sleeve and an outer sleeve that are coaxial and mounted to move axially relative to each other, and in that a space defined between the two sleeves is in fluid communication with the discharge circuit.

19 Claims, 11 Drawing Sheets

FEMALE QUICK-CONNECT COUPLING ELEMENT, AND A QUICK-CONNECT COUPLING INCORPORATING SUCH AN ELEMENT

BACKGROUND OF THE INVENTION

1. Field of the Invention

The invention relates to a female quick-connect coupling element and to a quick-connect coupling that can be used for releasably joining together two pipes for pressurized fluid, and that includes, inter alia, such a female element.

2. Brief Description of the Related Art

In the field of releasably joining together pipes through which pressurized fluid flows, it is known that a female coupling element can be used that is provided with controlled locking means for locking a male element in a configuration in which it is fitted into the female element, i.e. in a configuration in which the pipes are interconnected, the male and female elements constituting ends of respective ones of said pipes.

It is known from U.S. Pat. No. 5,095,947 that it is possible to provide a discharge circuit in a female quick-connect coupling element. In that way, a fluid held captive in the female element can be emptied through the discharge circuit by operating a specific valve member controlled by a rotary member associated with a piston. Such a construction is complex and requires numerous parts to be used that must be manufactured with precision and operation of which can deteriorate over the lifetime of the coupling. In addition, the equipment known from U.S. Pat. No. 5,095,947 is relatively voluminous and a large number of seals must be provided.

It is also known from U.S. Pat. No. 6,343,630 or from EP-A-1 596 119 to have an end of a duct of a female coupling element bear against an internal seal of a male element. Such female elements are bulky and need many seals.

More particularly, an object of the invention is to remedy those drawbacks by proposing a novel female quick-connect coupling element that is simpler and more reliable than prior art female quick-connect coupling elements, in particular by means of it having a smaller number of parts and a smaller number of seals, and that is more compact than the known equipments, while nevertheless operating reliably.

SUMMARY OF THE INVENTION

To this end, the invention provides a female quick-connect coupling element for releasably joining together pipes for pressurized fluid, said female element being suitable for receiving an end-piece of a male element in interfitting manner, along a longitudinal axis of said female element. Said female element is equipped with at least one locking member for locking an end-piece of a male element in the interfitted configuration, a fluid flow duct, a valve for controlling the flow of fluid through the flow duct, which valve includes an element mounted to move relative to a seat, a discharge circuit for discharging the fluid contained in an internal volume portion forming the flow duct downstream from the seat of the valve in the flow direction of the pressurized fluid and a hollow end-piece defining the flow duct in part and suitable for coming to bear against a seal carried by a male element fitted into the female element. This female quick-connect coupling element is characterized in that the hollow end-piece is constituted by an inner sleeve and by an outer sleeve that are coaxial and mounted to move axially relative to each other, in that the inner sleeve and the outer sleeve are each adapted to come into abutment against the seal carried by the male element and in that a space defined between the two sleeves is in fluid connection with the discharge circuit.

By means of the invention, the inner and outer sleeves of the hollow end-piece firstly enable a seal that is carried by a male coupling element to be held in a groove in said male element so as to provide sealing between the male element and the hollow end-piece, and secondly enables the pressurized fluid discharge to be controlled by giving access to or preventing access to the annular space provided between the two sleeves.

In advantageous but not compulsory aspects of the invention, such a female coupling element may incorporate one or more of the following characteristics, taken in any technically feasible combination:

- the space defined between the two sleeves opens out axially and onto the front of one of the sleeves or onto the fronts of both the sleeves into a circular volume about the longitudinal axis, which volume is in fluid communication with the internal volume portion;
- the inner sleeve is secured to or integral with a main body that defines the seat of the valve whereas the outer sleeve is secured to or integral with an auxiliary body that is mounted to move axially relative to the main body;
- the element is provided with transmission means for transmitting movement between a control lever mounted to move relative to the main body and the auxiliary body, to cause the auxiliary body to move relative to the main body, the lever being suitable for causing the valve to go from an open configuration to a closed configuration;
- an abutment, constrained to move with a first sleeve chosen from among the inner sleeve and the outer sleeve, co-operates with a first cam that is stepped along the longitudinal axis of the female element, that is constrained to move along the longitudinal axis of the female element with the second sleeve chosen from among the inner sleeve and the outer sleeve, and that is mounted to be slidable perpendicularly to the longitudinal axis of the female element in the second sleeve said first cam being drivable by a lever hinged to the female element;
- the first cam is secured to a second cam in abutment against a roller secured to a control ring for controlling a locking member that is mounted to move in a recess provided in a body of the female element, between a first position, in which the locking member is disengaged from a peripheral groove in an end-piece of a male element fitted into the female element, and a second position in which the locking member projects from the recess in a configuration in which it can be engaged in the groove of an end-piece of a male element fitted into the female element, and in that the second cam is suitable for being moved by the lever in a direction in which it pushes the roller back in a direction such that the control ring drives the locking member from its first position to its second position.
- the end of the inner sleeve is beveled on the outside and has a frustoconical end surface, and in that the value of the half-angle at the vertex of the frustoconical surface lies in the range 10° to 40°, and is preferably about 25°;
- the end of the outer sleeve is beveled on the outside and has a frustoconical end surface, and in that the value of the half-angle at the vertex of the frustoconical surface lies in the range 60° to 80°, and is preferably about 72°.

The invention also provides a quick-connect coupling for releasably joining together pipes for pressurized fluid, said coupling comprising two elements, namely a male element and a female element, which elements are suitable for fitting one into the other. This coupling is characterized in that the female element is a female element as mentioned above.

In other advantageous but non-compulsory aspects of the invention, such a coupling may incorporate one or more of the following characteristics, taken in any feasible combination:
- the male element is equipped with an internal circumferential groove and with a seal received in the groove and when the male element and the female element are in the locked configuration, as fitted one into the other, and with the valve in the open position, the inner sleeve is bearing against the seal, while the same seal prevents the fluid from flowing from the fluid flow duct towards the discharge duct;
- when the male element and the female element are in the locked configuration, as fitted one into the other, and with the valve in the open position, the same seal prevents the fluid from flowing from the flow duct towards the discharge circuit, and prevents the fluid from flowing towards the outside of the male element and of the female element via an interface zone defined between the outer sleeve and a body of the male element;
- when the male element and the female element are in the locked configuration, as fitted one into the other, and with the valve in the open position, the seal is in contact with the outside surface of the inner sleeve, with the front end of the outer sleeve, and with the bottom of the groove;
- when the male element and the female element are in the locked configuration, as fitted one into the other, and in the purge configuration, after the valve has been closed, the seal prevents the fluid from flowing towards the outside of the male element and of the female element via an interface zone defined between the outer sleeve and a body of the male element, but does not prevent the fluid from flowing from the flow duct towards the discharge circuit;
- between a locked configuration in which the male element and the female element are locked, as fitted one into the other, and with the valve in the open position, and a locked configuration in which the male element and the female element are locked, as fitted one into the other, and in the purge configuration after the valve has been closed, the outer sleeve moves relative to the inner sleeve in an axial movement towards the front of the female element;
- between an unlocked configuration in which the male element and the female element are not locked, as fitted one into the other and with the valve in the closed position, and a locked configuration in which the male element and the female element are locked, as fitted one into the other and with the valve in the open position, the outer sleeve moves relative to the inner sleeve in an axial movement towards the rear of the female element.

BRIEF DESCRIPTION OF THE DRAWINGS

The invention can be better understood and other advantages of the invention appear more clearly from the following description of three embodiments of a female coupling element and of a coupling that comply with the principle of the invention, the description being given merely by way of example and with reference to the accompanying drawings, in which.

DESCRIPTION OF THE PREFERRED EMBODIMENTS

The quick-connect coupling R that is shown in FIGS. 1 to 14 comprises a female element A and a male element or end-piece B that are designed to fit one into the other along an axis X-X' that, in practice, is a longitudinal axis that is common to the elements A and B.

By convention, it is considered that the front portion of an element A or B is that portion of said element that faces towards the other element on interconnecting them.

The rear portion of the female element A is in fluid connection with a first pipe $C_1$ that is itself connected to a pressurized fluid source (not shown), e.g. a source of a gas such as LPG or hydrogen at a pressure of about 300 bars. The rear portion of the male element B is connected to a second pipe $C_2$ that is itself connected to a member for using or for storing the fluid coming from the above-mentioned source. By way of example, the pipe $C_2$ may be connected to a tank on board a motor vehicle.

The male element B comprises a tubular body 11 to which the pipe $C_2$ is connected and that defines a fluid flow channel 12 through which pressurized fluid can flow. A non-return or "check" valve member 13 is mounted in the body 11 and comes to bear against a seat formed by a seal 14 received in an internal peripheral groove 15 in the body 11, under drive from a spring (not shown).

On its outside peripheral surface 16, the body 11 is provided with a circularly symmetrical peripheral groove 17 of profile defined by a bottom 17a that is flat and by two edges 17b and 17c that diverge going away from the bottom 17a. Thus, the bottom 17a is circularly cylindrical whereas the edges 17b and 17c are frustoconical.

On its radially inner surface 18, the body 11 is also provided with a circularly symmetrical peripheral groove 19, in which an elastomer O-ring seal 20 is received.

Figure 5:
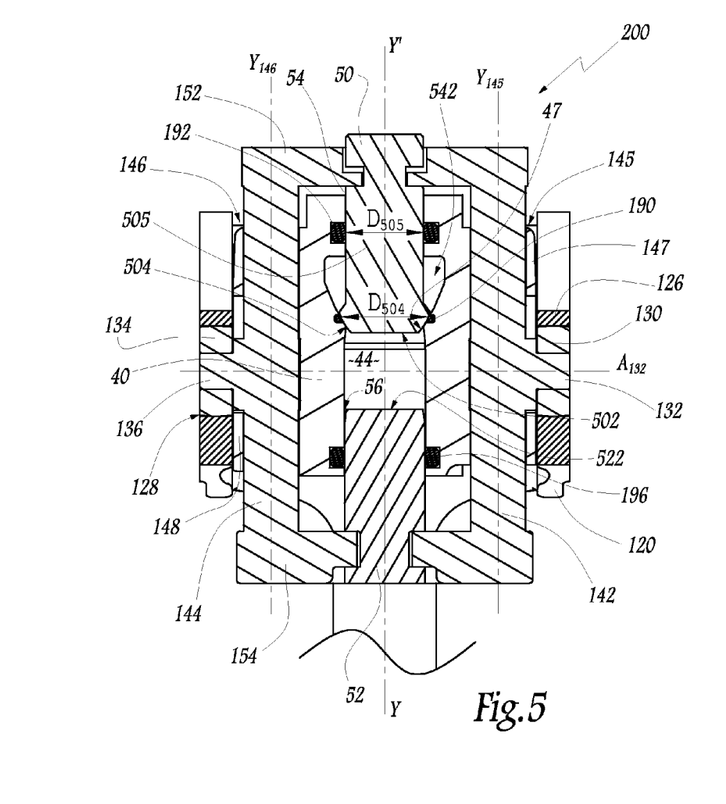
FIG. 5 is a section view on a larger scale on line V-V of FIG. 3.
Figure 12:
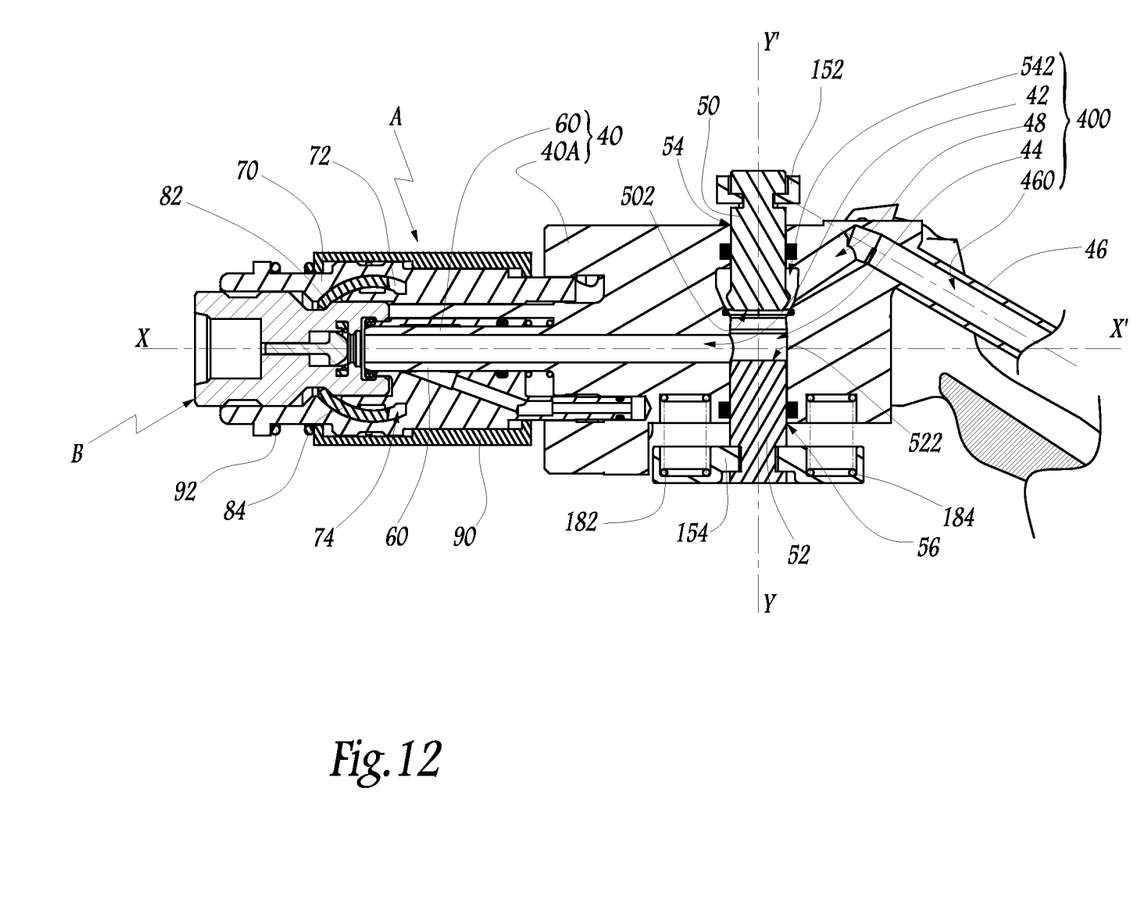
FIG. 12 is a section view on the plane XII-XII of FIG. 2 while the coupling elements are in the configuration of FIGS. 10 and 11.
Figure 13:
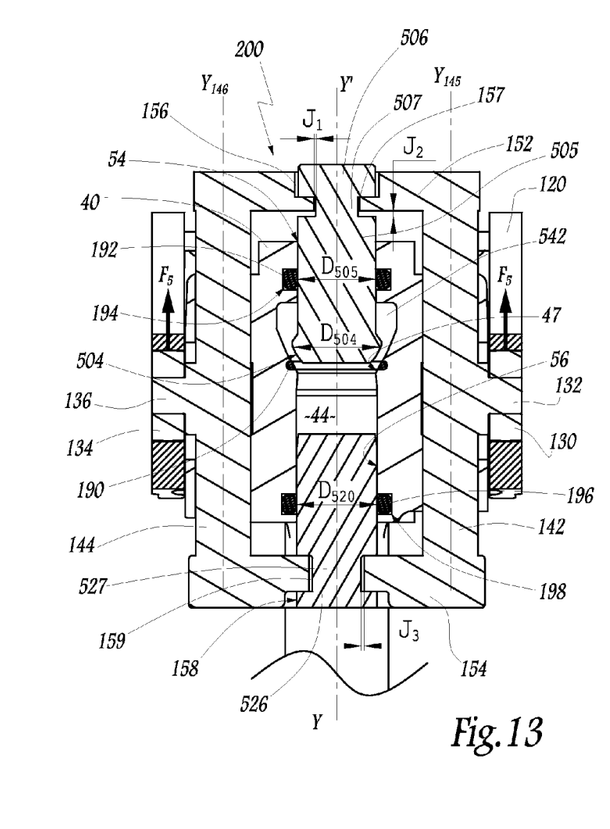
FIG. 13 is a section view on a larger scale on line XIII-XIII of FIG. 10.

The female element A comprises a main body 40 that can be seen more particularly in FIG. 12, and in which a first piston 50 and a second piston 52 are received, the pistons being visible in FIGS. 5, 12, and 13, and being mounted respectively in a first bore 54 and in a second bore 56 that are aligned with each other and that have a common central axis Y-Y' that is perpendicular to the axis X-X'. The main body 40 forms a channel 42 through which pressurized fluid can flow from a chamber 44 defined between facing surfaces 502 and 522 of the pistons 50 and 52. The surfaces 502 and 522 constitute two opposite surfaces perpendicular to the axis Y-Y' and in contact with the fluid flowing through the coupling element A when the valve 200 is open.

The main body 40 is extended by a pipe 46 that is terminated by a flange 462 to which the pipe $C_1$ is connected. A channel 48 connects the internal volume 460 of the pipe 46 to an annular space 542 around the piston 50.

Thus, the internal volume 460 of the pipe 46, the channel 48, the space 542, the chamber 44 and the channel 42 together define a duct 400 through which pressurized fluid can flow inside the female coupling element A from the pipe $C_1$. The pressurized fluid is caused to flow in the duct 400 by a valve 200 in which the pistons 50 and 52 constitute moving elements.

The channel 42 extends both inside a solid portion 40A of the main body 40 and inside an inner sleeve 60 that extends the portion 40A along X-X' towards the front of the element A. The inner sleeve 60 is cylindrical, of circular section and hollow. The inner sleeve 60 is shown in the figures as being integral with the portion 40A of the body 40. In a variant, the inner sleeve 60 may be mounted on the body, e.g. by screw-fastening or by welding.

The fact that the inner sleeve 60 is provided in the main body 40 makes it possible to minimize the disturbance of the fluid flow and to limit the number of parts in contact with the fluid, which constitutes an advantage in particular when the fluid is hydrogen.

An auxiliary body 70 is mounted on the main body 40 with it being possible for said auxiliary body to move axially relative to the main body, parallel to the axis X-X'. The auxiliary body 70 is subjected to the action of a spring 789 that urges it back along the axis X-X' towards the front of the female element A.

The auxiliary body 70 defines two recesses 72 and 74 in which two locking members 82 and 84 are received. These locking members are mounted to move between a first position in which they are fully engaged in the recesses 72 and 74, so that they do not project radially from the auxiliary body 70 towards the axis X-X', and a second position in which said locking members 82 and 84 project from the recesses 72 and 74 towards the axis X-X', to the extent that they can be partially engaged in the groove 17 in the body 11 and can thus retain the male element B in the locked position in the auxiliary body 70. The locking members 82 and 84 have opposite surfaces in the shape of segments of a sphere, and the recesses 72 and 74 are also in the shape of segments of a sphere, thereby imparting good radial compactness to the auxiliary body 70.

In variants of the invention that are not shown, the locking members may be studs disposed in recesses that are inclined relative to the axis X-X', as described in EP-1 531 297, or balls, as described in EP-A-1 561 991. The present invention is applicable independently of the exact type of the locking members used.

A control ring 90 is slidably mounted along the axis X-X' around the auxiliary body 70 that has a radially outer surface of circular section. The ring 90 is subjected to the action of a spring 92 that urges it back towards the solid portion 40A of the main body 40.

Mechanical link means (not shown) connect the ring 90 to the locking members 82 and 84, so that, by sliding around the auxiliary body 70, the ring 90 makes it possible to control the positions of the locking members 82 and 84 along the axis X-X' and relative to their respective recesses 72 and 74. Thus, it is possible to lock the male element B in the female element by moving the ring 90 relative to the auxiliary body 70 towards the front of the element A, i.e. in a direction such that the locking members 82 and 84 are brought from their above-mentioned first position to their above-mentioned second position.

The auxiliary body 70 surrounds the inner sleeve 60 and defines a volume 76 for receiving the front edge 111 of the body 11 of the male element.

The auxiliary body 70 forms a cylindrical hollow outer sleeve 78 that is coaxial with the inner sleeve 60 and that extends radially between the recess 76 and the inner sleeve 60, and on which the force from the spring 789 is exerted. Reference 62 designates the end of the inner sleeve 60 that is opposite from the portion 40A of the main body 40 and that is surrounded by the outer sleeve 78 in the position shown in FIGS. 1 to 7.

The portions 60 and 78 of the element A together constitute a hollow end-piece 80 inside which a portion of the fluid flow duct 400 is defined and that can come to bear against the O-ring seal 20, as appears from the following explanations.

When the female coupling element A is in a decoupled configuration, the outer sleeve 78 surrounds the end 62 to the extent that their respective front edges are substantially aligned in a direction perpendicular to the axis X-X'.

A discharge duct 100 is provided transversely in the auxiliary body 70 and is extended to the level of the radially outer surface 64 of the inner sleeve 60.

Figure 1:
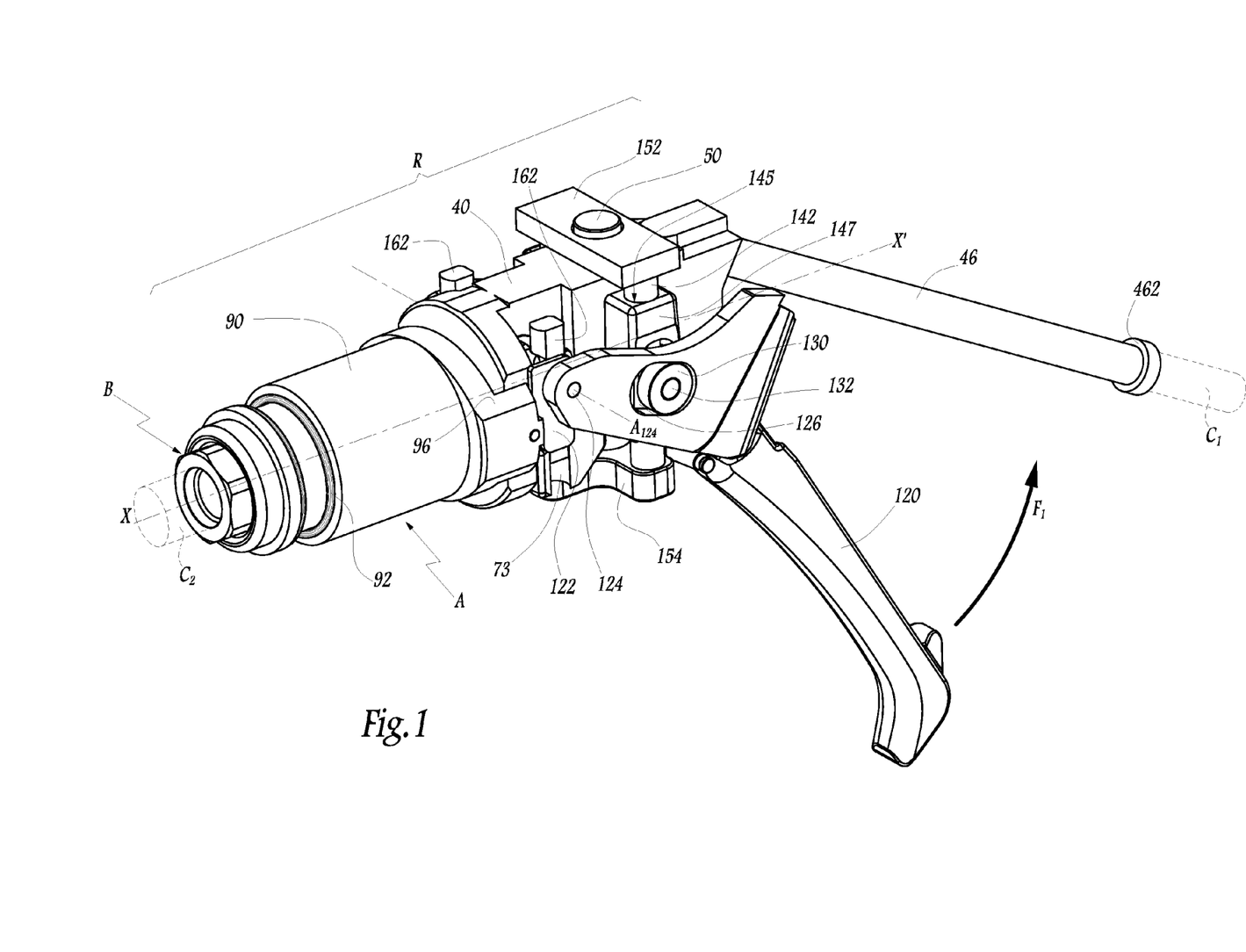
FIG. 1 is a perspective view of a coupling of the invention that incorporates a female element of the invention and a male element engaged in the female element without being locked therewith.
Figure 2:
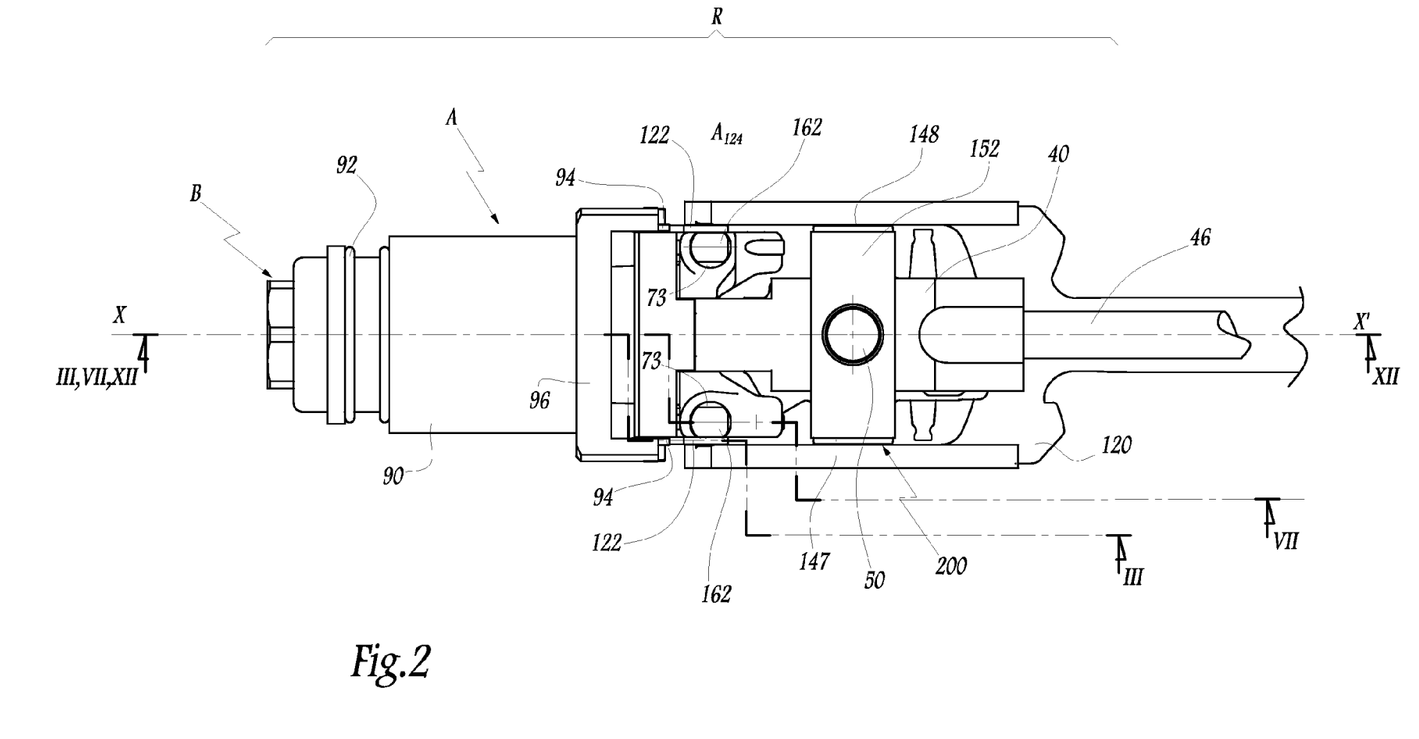
FIG. 2 is a plan view of the coupling of FIG. 1.
Figures 3, 4:
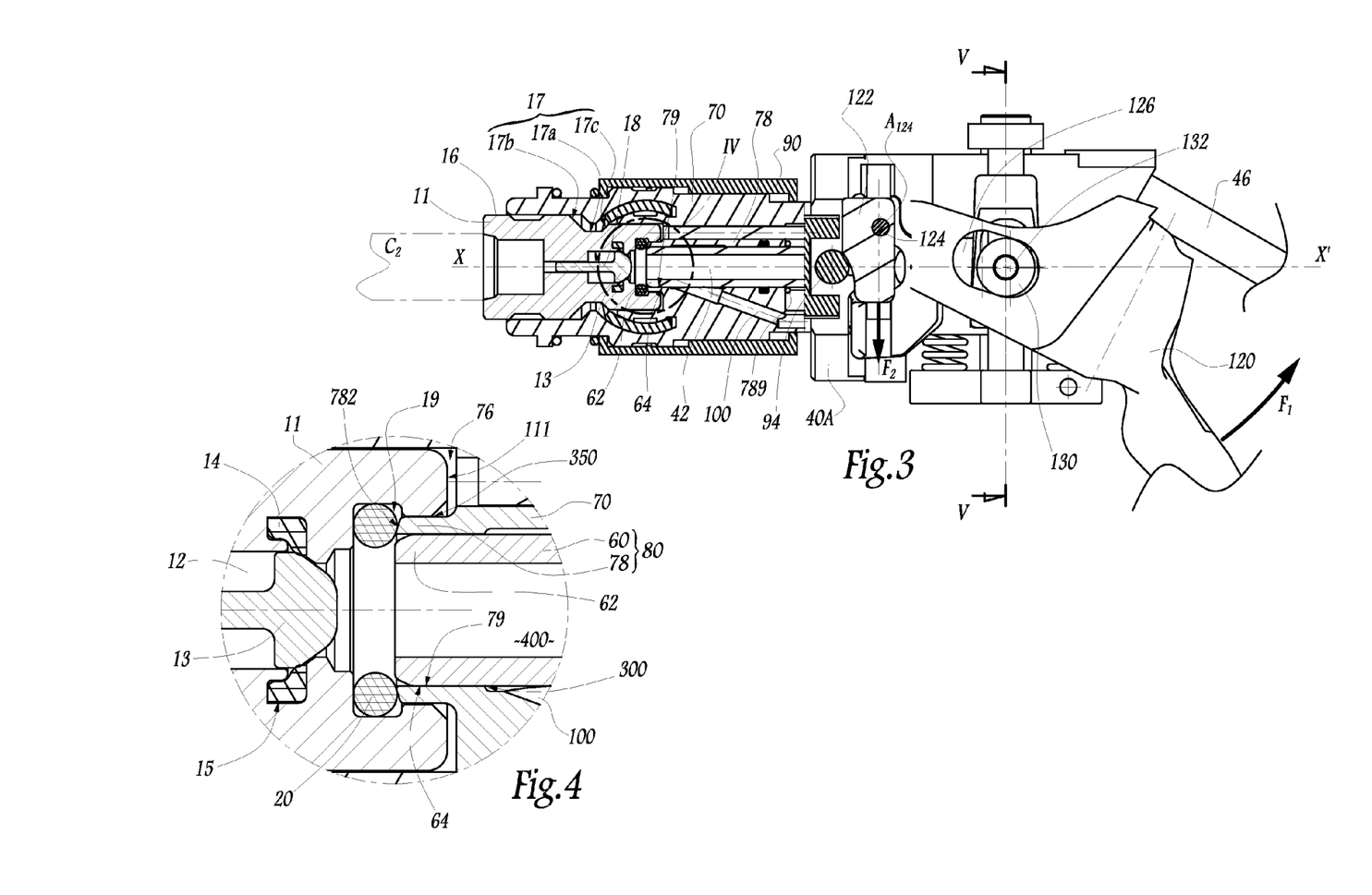
FIG. 3 is a section view on a larger scale on line III-III of FIG. 2, a portion of a pipe and of an actuation lever for actuating the female element being omitted in order to make the drawing clearer.
FIG. 4 is a view on a larger scale of the detail IV of FIG. 3.

The discharge duct 100 communicates with the fluid flow duct 400 through an annular space 300 defined between firstly the radially outer surface 64 of the inner sleeve 60 and secondly the radially inner surface 79 of the outer sleeve 78. The annular space 300 is in fluid communication with the discharge circuit 100 regardless of the relative position of the inner sleeve 60 and of the outer sleeve 78 while the coupling R is operating. In addition, the annular space 300 opens out axially and onto the fronts of the sleeves 60 and 78 in a circular volume around the axis X-X', said volume being in communication with the channel 42 of the fluid flow duct 400. The fact that the radial thickness $e_{300}$ of the annular space 300 is very small, of the order of 0.025 millimeters (mm), combined with the fact that the inner sleeve 60 and the outer sleeve 78 are coaxial imparts good radial compactness to the female element A A lever 120 is hinged to the cam 122 by means of a stud 124, the longitudinal axis of which is referenced $A_{124}$. In practice, two cams 122 are mounted on either side of the body 40 as can be seen in FIG. 2, and the lever 120 is hinged to these two cams, around a common axis $A_{124}$. In FIG. 3, the portion of the lever 120 that is hinged to the cam 122 is not shown, in view of the section plane. The trace of this hinge portion can be seen in chain-dotted lines in FIG. 6.

The lever 120 is provided with a first slot 126 in which a roller 130 mounted to rotate about a stud 132 is engaged. The lever 120 is also provided with a second slot 128 that is masked in FIG. 1 and in which a roller 134 mounted to pivot about a stud 136 is engaged.

The studs 132 and 136 are secured to or integral with respective ones of a first column 142 and of a second column 144 that extend between a first plate 152 and a second plate 154 on which the pistons 50 and 52 are respectively mounted. The columns 142 and 144 constitute mechanical link means between the plates 152 and 154 and they are also the means common to the pistons 50 and 52 and on which the wheels 130 and 134 act to cause the pistons 50 and 52 to move in the opening direction or the closure direction for opening or closing the valve 200. The columns 142 and 144 are slidably mounted in two bores 145 and 146 that are provided in external portions 147 and 148 of the main body 40. The bores 145 and 146 are centered on axes $Y_{145}$ and $Y_{146}$ parallel to the axis Y-Y'. The axes $Y_{145}$ and $Y_{146}$ lie on either side of the plane formed by the axes X-X' and Y-Y'.

In FIGS. 5 and 13, the elements 132, 136, 142, 144, 152, and 154 are shown as formed integrally in one piece. In practice they may be made up of a plurality of elements assembled together by any suitable means, in particular by welding or screw-fastening.

Given the manner in which it is mounted on the main body 40, the lever 120 is suitable for pivoting sequentially about the wheels 130 and 134, and then about the axis $A_{124}$ and vice versa.

Each cam 122 bears against a roller 94 that is secured to the control ring 90 through a clevis 96.

Figures 8, 9:
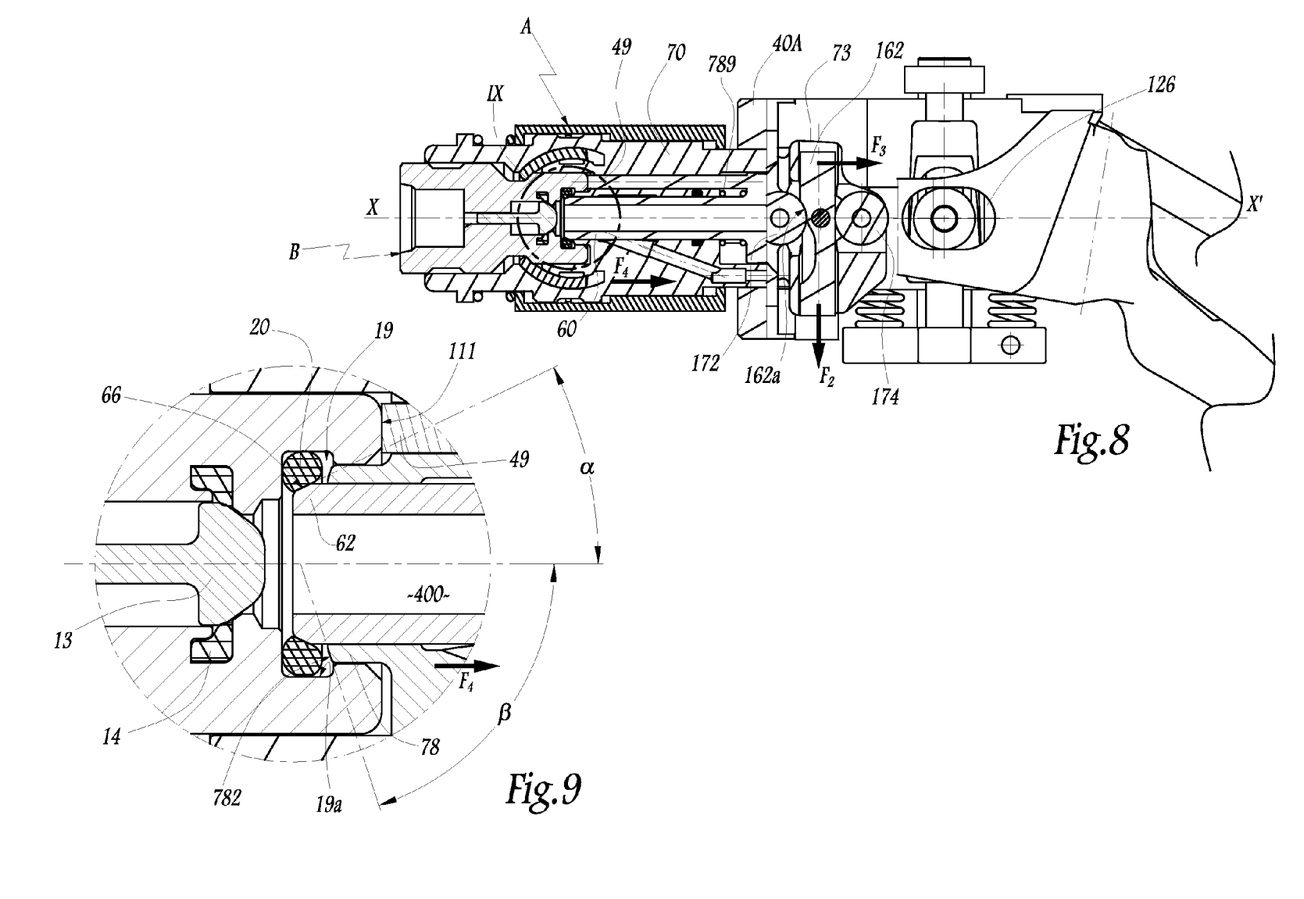
FIG. 8 is a section view analogous to FIG. 7, while the female element is coming into leaktight contact with a seal carried by the male element of the coupling.
FIG. 9 is a view on a larger scale of the detail IX of FIG. 8.
Figures 10, 11:
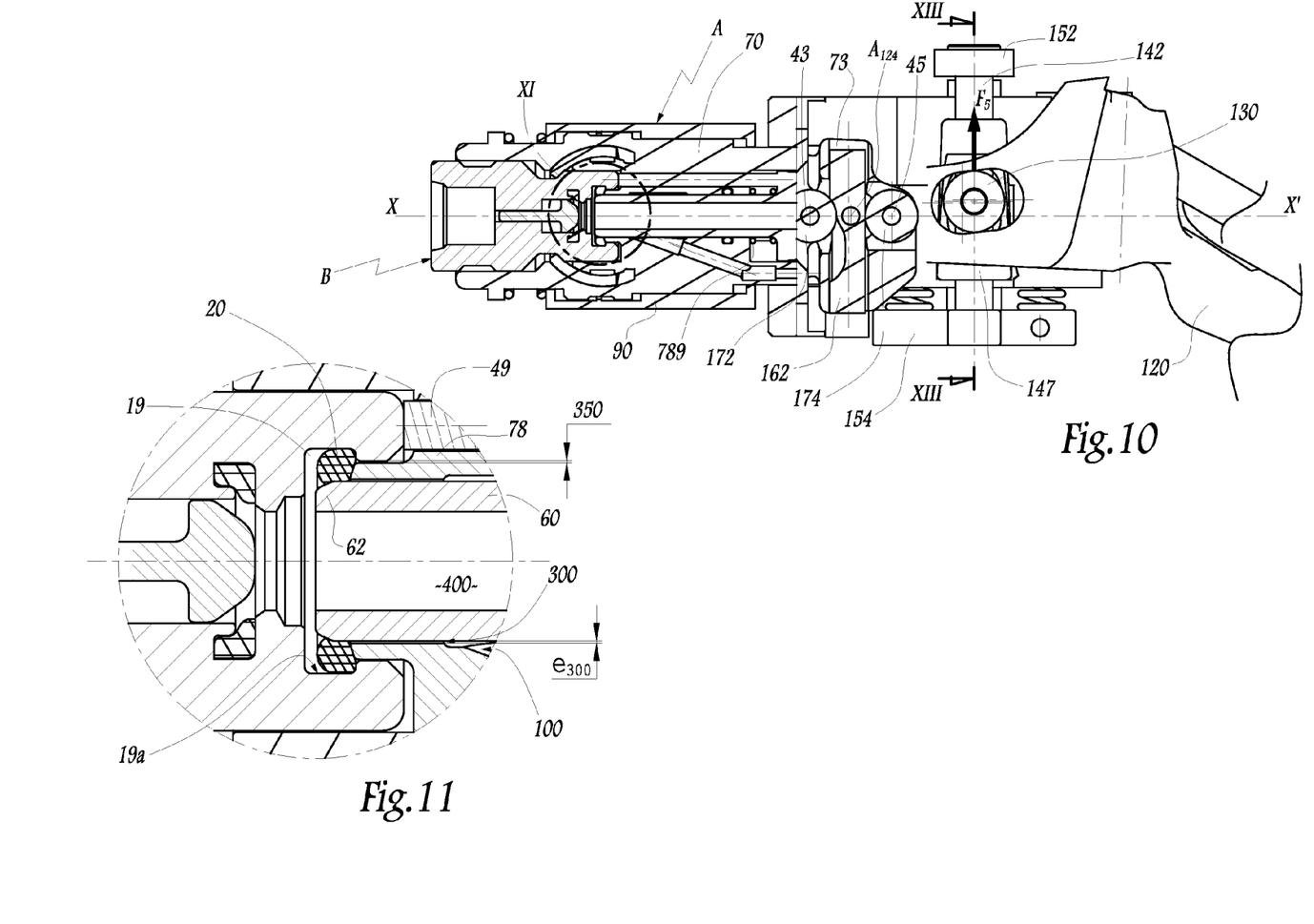
FIG. 10 is a section view analogous to FIG. 7, while a valve for controlling the flow of fluid inside the female element is being opened.
FIG. 11 is a view on a larger scale of the detail XI of FIG. 10.

Each cam 122 is secured via its stud 124 to a second cam 162 that is slidably mounted in a recess 73 formed in the auxiliary body 70. The direction of sliding $D_{162}$ of a cam 162 in its recess 73 is imposed by the geometrical shape of the auxiliary body 70. This direction of sliding is parallel to the axis Y-Y'. As can be seen in FIG. 8, for example, for the cam 162 shown in FIG. 1, each cam 162 is disposed between two wheels 172 and 174. Each wheel 172 is mounted to turn about a stud 43 secured to or integral with the main body 40, and each wheel 174 is mounted to turn about a stud 45 secured to or integral with the auxiliary body 70.

Operation is as follows: Starting from a configuration in which the female element A and the male element B are spaced apart, the male element B is fitted into the female element A by causing it to move in translation along the axis X-X' in a manner such that the seal 20 comes into abutment against the front edge of the outer sleeve 78. This is the configuration shown in FIGS. 1 to 5. The contact between the hollow end-piece 80 and the male element B in this configuration offers the advantage of imparting good axial compactness to the coupling R. In this configuration, in which the female element A and the male element B are interfitted and not locked, two springs 182 and 184 disposed between the plate 154 and the main body 40 together with the pressure of the fluid in the annular space 542 exert a force on the assembly made up of the parts 50, 142, 144, 152, and 154 that presses the piston 50 against a corresponding seat 47 formed by the main body 40 and closes the valve 200.

Figure 6:
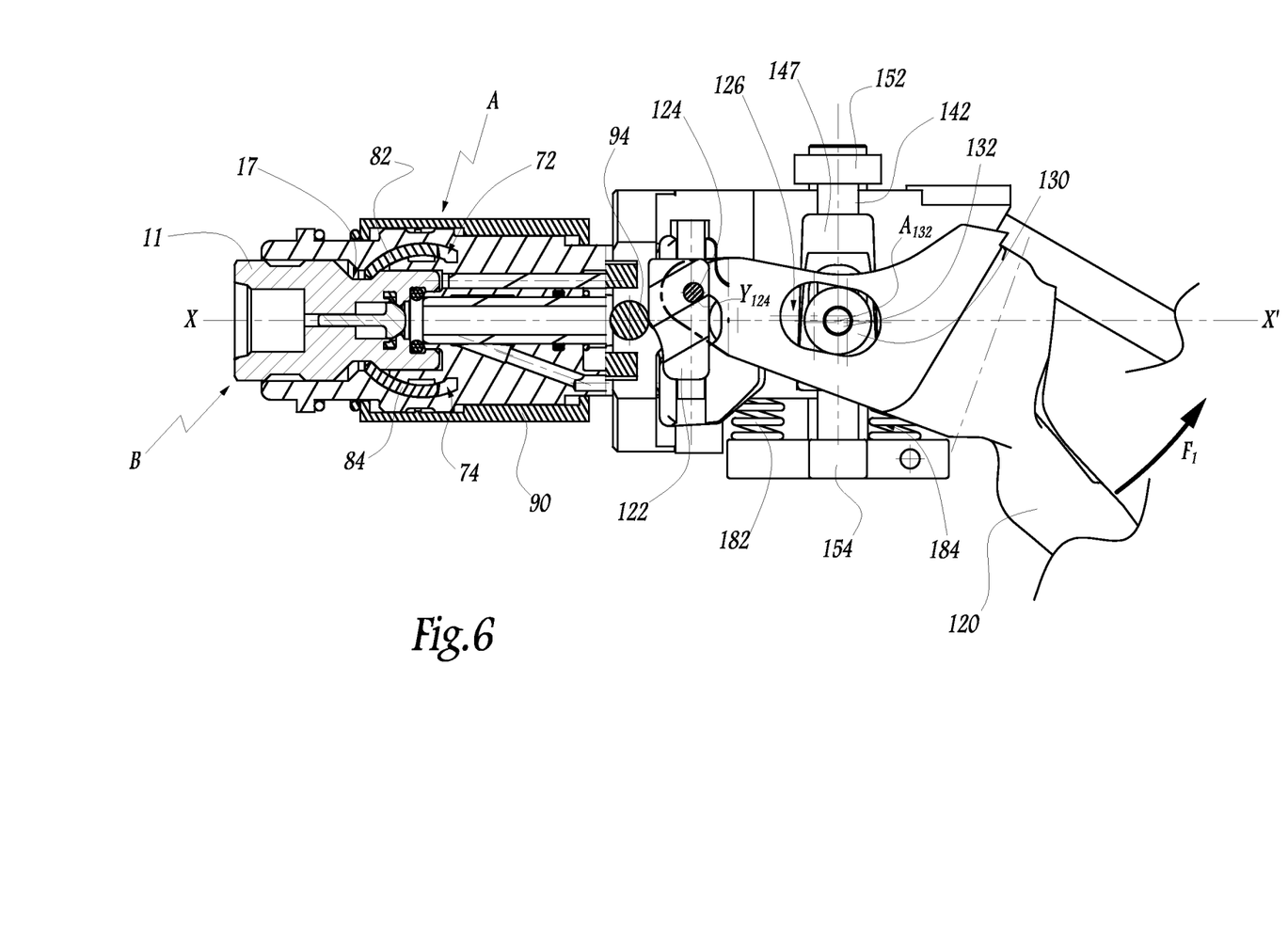
FIG. 6 is a section view analogous to FIG. 3, while the male element is being locked into the female element.
Figure 7:
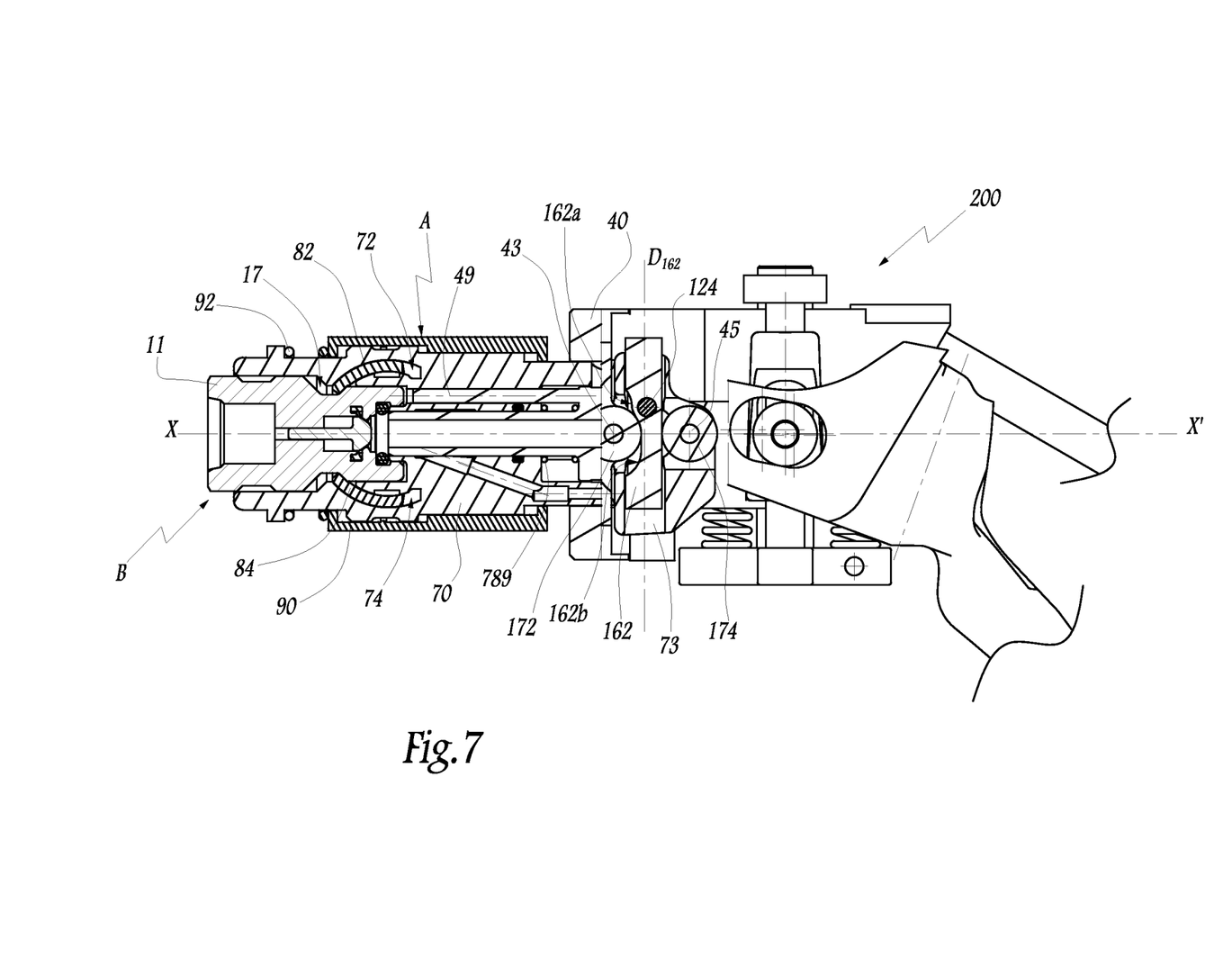
FIG. 7 is a section view on line VII-VII of FIG. 2, while the coupling elements are in the configuration of FIG. 6.

Starting from this configuration, the operator actuates the lever 120 by exerting a force on it that urges it to pivot towards the pipe 46, as indicated by the arrow $F_1$. The lever 120 then pivots about the wheels 130 and 134, thereby causing the cams 122 to move in the direction indicated by the arrow $F_2$ in FIG. 3, the direction of this movement being imposed by the cams 162 being guided in their recesses 73. The lever 120 pivots about the wheels 130 and 134 while being guided by their outside surfaces because the forces to be overcome to move the auxiliary body 70 and the control ring 90, parallel to the axis X-X', relative to the main body 40, are smaller than the forces to be overcome to move the wheels 130 and 134 and the pistons 50 and 52 parallel to the axis Y-Y'. In view of the fact that the resilient force exerted by the spring 92 on the control ring 90 is less than the resilient force exerted by the spring 789 on the auxiliary body 70, and because of the geometrical shape of the cams 122, the effect of these cams being moved in the direction indicated by arrow $F_2$ is to push the rollers 94 back towards the front of the male element A. This movement of the rollers 94 causes the control ring 90 to be moved along the axis X-X' against the resilient force exerted by the spring 92, thereby, in view of the drive link means between the ring 90 and the locking members 82 and 84, causing the locking members 82 and 84 to come out of their respective recesses 72 and 74 to the extent that they engage in the groove 17, as shown in FIGS. 6 and 7. The locking members thus go from their first position to their second position. The body 11 of the male element B is thus locked in the auxiliary body 70 of the female element A.

During the movement of the control ring 90, the cam 162 and the auxiliary body 70 do not move along the axis X-X' relative to the main body 40. The cam 162 co-operates with the wheel 172 at a portion 162b of the stepped surface 162a of the cam 162 that is perpendicular to the axis X-X'. Thus, the front ends of the inner sleeve 60 and of the outer sleeve 78 remain aligned in a direction perpendicular to the axis X-X'.

By continuing to move the lever 120 about the wheels 130 and 134, the user continues to move the cams 122 and 162 in the direction indicated by arrow $F_2$, thereby moving the cams 162 towards the rear of the female element A relative to the main body 40 against the spring 789. Each cam 162 bears against a wheel 172 or the like that is secured to the main body 40 through the stud 43. By moving downwards in FIG. 7, the cam 162 is pushed back towards the rear of the main body 40 because a surface of the stepped cam surface 162a that is offset forwards along the axis X-X' relative to the portion 162b comes to bear against the radially outer surface of the wheel 172.

Since each cam 162 is engaged in a recess 73 in the auxiliary body 70, this rearward movement of the cam 162 along the axis X-X', in the direction indicated by arrow $F_3$ in FIG. 8, generates a corresponding movement indicated by arrow $F_4$ for the auxiliary body 70. The effect of this movement as indicated by $F_4$ is to bring the body 11 as captive of the auxiliary body 70 to bear against the end of a stud 49 formed by the main body 40 and that extends parallel to the inner sleeve 60 at a distance therefrom. This movement also causes the sleeve 78 to move along the axis X-X' relative to the inner sleeve 60 towards the rear of the female element A. The front edges of the inner sleeve 60 and of the outer sleeve 78 are therefore no longer in alignment.

While the auxiliary body 70 is moving as indicated by arrow $F_4$ by co-operation between the cam 162 and the wheel 172, the control ring 90 that is constrained to move with the cam 162 along the axis X-X' undergoes the same movement as the auxiliary body 70.

Within the reference frame of the male element B that is the reference frame of the body 11 and of the seal 20, the effect of the above-mentioned movement of the auxiliary body 70 relative to the main body 40 is to cause the end 62 of the inner sleeve 60 to advance towards the seal 14 and to bring the outside surface of the inner sleeve 60 into contact with the seal 20. As appears from FIG. 9, the effect of this movement is to press the O-ring seal 20 firmly against the bottom 19a of the groove 19.

The end 62 is beveled on the outside. It is defined by a frustoconical surface 66 converging towards the front of the female element A and of half-angle α at the vertex that has a value lying in the range 10° to 40°. Preferably, the value of the angle α is about 25°. This geometrical shape of the end 62 enables it to interact with the seal 20 without "marking" or wearing said seal excessively during successive manipulations of the coupling R.

In addition, the front end of the outer sleeve 78 is beveled on the outside and defined by a frustoconical surface 782 converging towards the front and of half-angle β at the vertex that lies in the range 60° to 80°, and that is preferably about 72°. This bevel generates a wedge effect that retains the seal 20 in the groove 19, in spite of the friction exerted by the outside surface of the inner sleeve 60 as it moves relative to the outer sleeve 78 for emptying purposes.

Starting from the configuration of FIGS. 8 and 9, when the user continues to pivot the lever 120 in the direction indicated by arrow $F_1$, said lever no longer pivots about the rollers 130 and 134 but rather about the axis $A_{124}$. At this stage, the body 11 that is constrained to move in translation with the auxiliary body 70 is in abutment against the stud 49 of the main body 40, thereby making it impossible for the cam 162 to move as indicated by arrow $F_2$ because the wheel 172 would have to co-operate with a surface of the cam 162 that is offset forwards along the axis X-X'. The drive linkage described thus makes it possible to make opening of the valve 200 dependent on the presence of a male element B locked inside the female element A. The cam 162 has then reached an end-of-stroke position in which the stud 124 is held stationary. Thus, the effect of continuing to move the lever 120 in the direction indicated by arrow $F_1$ is to transmit to the rollers 130 and 134 a force represented by arrows $F_5$ in FIGS. 10 and 13. This force moves the equipment made up of the parts 50, 52, 142, 144, 152, and 154 against the force exerted by the springs 182 and 184 and by the pressure of the fluid in the annular space 542. This equipment constitutes the moving portion of the valve 200 formed in the female element A, while the main body 40 constitutes the stationary portion of the valve 200 and carries the seat 47.

The geometrical shape of the slots 126 and 128 makes them compatible with the lever 120 pivoting about the axis $A_{124}$, while the axis $A_{132}$ remains in the same position along the axis X-X' during the movement of the moving equipment of the valve 200.

The parts 142, 144, 152, and 154 constitute mechanical link means between the upstream piston 50 and the downstream piston 52, these link means being disposed outside the fluid flow duct 400 in the female element A. As a result, the mechanical link means are not subjected to the chemical action of the fluid flowing through the coupling R, and do not hinder flow of the fluid.

An O-ring seal 190 is mounted in the main body 40 at the seat 47 against which a surface 504 of the piston 50 can come to bear, which surface is in the shape of a segment of a sphere. The piston 50 is formed integrally in one piece and it has an intermediate portion 505 that is circularly cylindrical and that is engaged with a small amount of clearance into the bore 54 that is also circularly cylindrical. An O-ring seal 192 is disposed in a groove 194 provided in the radial surface of the bore 54 and provides sealing between the annular space 542 and the outside of the body 40. The sealing section between the piston 50 and the main body 40 at the seal 192 corresponds to a disk of diameter equal to the diameter $D_{505}$ of the portion 505.

Reference $D_{504}$ designates the diameter of the sealing section between the piston 50 and the main body 40 at the seal 190 when the valve is in the closed configuration. The diameter $D_{504}$ is greater than the diameter $D_{505}$. As a result, when the valve 200 is in the closed configuration, i.e. when the piston 50 is bearing against the seat 47, the force exerted by the fluid on the piston 50 in the closing direction for closing the valve, which force is proportional to the diameter $D_{504}$, is greater than the force from the fluid on the piston 50 in the opening direction, which force is proportional to the diameter $D_{505}$, and the resultant of the pressure forces to which the piston 50 is subjected tends to press said piston against its seat.

The springs 182 and 184 close the valve in the event of insufficient pressure upstream from the seat 47. The difference between the diameters $D_{505}$ and $D_{504}$, which difference is about 10%, remains small, thereby resulting in a small valve opening force in spite of the high pressure.

In the example shown in the figures, the piston 50 is circularly symmetrical. However, it may have some other geometrical shape, and the default force for pressing the piston 50 against its seat 47 is obtained so long as the area of the cross-section of the piston 50, measured where it is in leaktight contact with the bore 54 perpendicularly to the axis Y-Y', is less than the area of the cross-section of the piston 50 where it bears against the seat 47 when the valve 200 is in the closed position.

In the direction Y-Y', the piston 50 has a head 506 connected to the portion 505 via a rod 507 of small diameter. The piston 50 is mounted on the plate 152 by inserting the head 506 into a recess 156 formed in the side of the plate 152 that is opposite from the main body 40. Radial clearance $J_1$ is provided between the rod 507 and the edge of an orifice 157 through which the rod passes, at the bottom of the recess 156. This radial clearance $J_1$ makes it possible to adjust the position of the piston 50 relative to the plate 152, in a direction perpendicular to the axis Y-Y'.

In addition, the head 506 is mounted in the recess 156 with axial clearance $J_2$, parallel to the axis Y-Y'. This makes it possible to adjust the axial position, along the axis Y-Y', of the piston 50 relative to the plate 152, in particular when the piston comes to bear against its seat 47.

The piston 52 is circularly cylindrical and the bore 56 has a corresponding circular section. An O-ring seal 196 is installed in a groove 198 provided in the radial surface of the bore 56. The sealing section for sealing between the piston 52 and the bore 56 at the seal 196 is provided on a disk of diameter equal to the diameter $D_{520}$ of the piston 52. The diameter $D_{520}$ is greater than the diameter $D_{505}$ so that, when the valve is in the open configuration shown in FIG. 13, the force exerted by the fluid on the piston 52, in particular at its surface 522, directed in the closing direction for closing the valve, and proportional to the diameter $D_{520}$, is greater than the force from the fluid on the piston 50, in particular at its surface 502, directed in the opening direction and proportional to the diameter $D_{505}$, and the resultant of the pressure forces due to the presence of the fluid in the space 542 and in the chamber 44 and that are applied to the moving equipment tends to re-close the valve.

This operation can be obtained so long as the area of the cross-section of the piston 52 where it is in leaktight contact with the bore 56 is greater than the area of the cross-section of the piston 50 where it is in leaktight contact with the bore 54.

The difference between the diameters $D_{505}$ and $D_{520}$ is about 4% and is therefore not visible on the drawings.

When the valve is open, and due to the forces exerted by the pressure from the fluid on the pistons 50 and 52, the columns 142 and 144 are subjected to non-harmful traction stresses because the columns 142 and 144 are disposed outside the flow duct 400 and are thus dimensionable without disturbing passing of the fluid.

The piston 52 has a head 526 and a rod 527 of geometrical shapes similar to those of the elements 506 and 507. A recess 158 and an orifice 159 comparable to the recess 156 and to the orifice 157 are provided in the plate 154 and they make it possible to receive, respectively, the head 526 and the rod 527 with radial clearance $J_3$, thereby making it possible to adjust the position of the piston 52 relative to the plate 154 perpendicularly to the axis Y-Y'. The recesses 156 and 158 receive the head 506 and 526 with radial clearances respectively at least equal to or indeed greater than the clearances $J_1$ and $J_3$. In a variant, the clearances $J_1$ and $J_3$ to be taken into consideration are defined at the heads 506 and 526, the orifices 157 and 159 receiving the rods 507 and 527 with at least equal or indeed greater radial clearance.

Due to the valve 200 being opened, the pressurized fluid coming from the pipe 46 flows into the channel 42 after having passed through the portions 48, 542, and 44 of the flow duct 400, at pressure sufficient to push the non-return valve member 13 back into the body 11 of the male element, so that said male element moves away from the seal 14 and allows the fluid to pass into the channel 12. When the male and female elements are in the locked configuration, with the valve 200 open, allowing the fluid to flow, said pressure is also exerted on the seal 20 which is thus pressed against the bottom 19a of the groove 19, against the outside surface of the sleeve 60, and against the front end of the outer sleeve 78. In this position shown in FIG. 11, the seal 20 prevents the fluid from passing both through the interface zone between the body 11 and the outer sleeve 78, i.e. through the annular space 350 defined between the body 11 of the male element B and a portion of the auxiliary body 70 of the female element A, and also through the interface zone between the inner sleeve 60 and the outer sleeve 78, i.e. the annular space 300. In this way, the seal 20 prevents pressurized fluid from flowing both towards the outside of the bodies 11 and 70 and also towards the discharge duct 100. This double-sealing function of the seal 20 makes it possible to simplify construction and to save money.

Figures 14, 15:
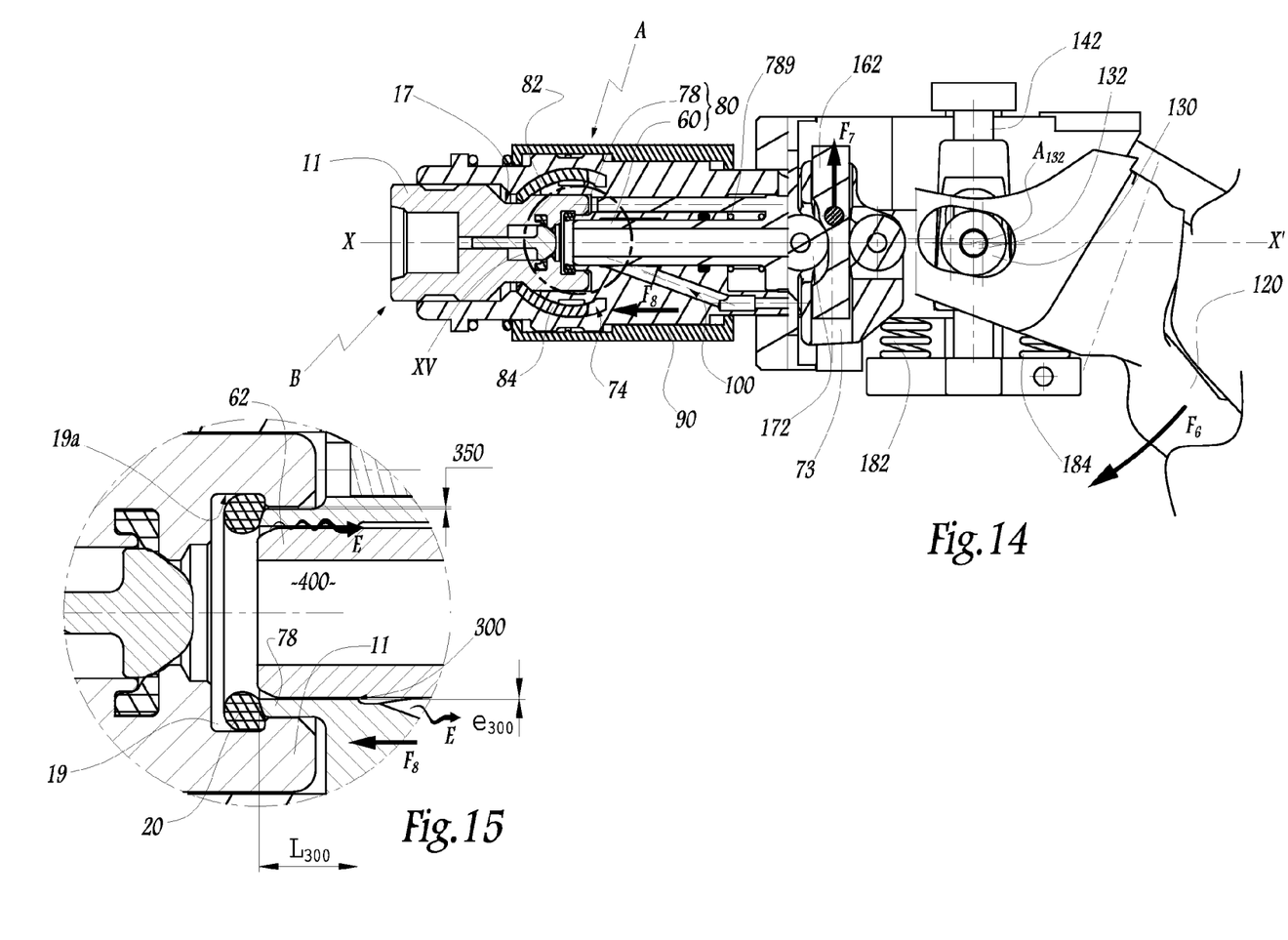
FIG. 14 is a section view analogous to FIG. 7, while the valve of the female element is being closed and while a fluid present in the coupling is being emptied.
FIG. 15 is a view on a larger scale of the detail XV of FIG. 14.

When the valve is to be re-closed before decoupling the male and female elements B and A, the operator pivots the lever 120 in the direction indicated by arrow $F_6$ in FIG. 14, i.e. in the direction opposite to the direction indicated by arrow $F_1$. By a movement that is the reverse of the movement explained above with reference to the lever 120, the effect of the operator pivoting the lever in this direction is to bring the piston 50 to bear against its seat 47. The valve is thus closed, interrupting the flow of fluid. Since the valve member 13 is no longer pushed back into the channel 12 by the pressure of the fluid flowing in the male element B, it is brought back against its seat by a spring (not shown). The effect of continuing to move the lever 120 in the direction indicated by arrow $F_6$ is to move the cams 162 and 122 in the direction indicated by arrow $F_7$ in FIG. 14. This movement of the cams 162 that are still engaged between the wheels 172 and 174 allows the auxiliary body 70 to move relative to the main body 40 towards the front of the female element A, i.e. leftwards in FIG. 14, as indicated by arrow $F_8$ in FIG. 14. The forward movement of the auxiliary body 70 takes place by means of the action of the spring 789 that is exerted on the outer sleeve 78 and by means of the pressure of the captive fluid that is exerted on the body 11 of the male element B, urging it to move back out of the female element A and holding the locking members 82 and 84 in the groove 17.

As appears from FIG. 15, the effect of this movement is to bring the outer sleeve 78 into a configuration in which its front edge is substantially aligned, in a direction perpendicular to the axis X-X', with the front edge of the end 62. In this configuration in which the pressurized fluid that is captive between the piston 50 and the valve member 13 needs to be emptied, the O-ring seal 20 is pressed against the bottom 19a of the groove 19 and against the front end of the sleeve 78, but is no longer in contact with the sleeve 60. The shape of the outer sleeve 78, and in particular the value of the angle β, is chosen so as not to mark the seal 20 in this position.

The annular space 300 opens out directly into the groove 19 that communicates with a volume formed by the interconnection of the fluid flow duct 400 and of the flow channel 12 upstream from the valve member 13. The space 300 opens out into the groove 19 in axial manner and at the front edges of the inner sleeve 60 and/or of the outer sleeve 78.

In this configuration in which the male element B is locked in the female element A, with the valve 200 closed, and the female element emptied, the O-ring seal 20 prevents fluid from flowing into the interface zone between the outer sleeve 78 and the body 11 of the male element B, i.e. into the annular space 350, so that the male element B and the female element A remain in leaktight contact and so that the fluid is not discharged towards the outside of the assembly formed by the bodies 11 and 70. Conversely, the O-ring seal 20 no longer prevents fluid from flowing into the interface zone 300 between the sleeves 60 and 78, so that the pressurized fluid can flow through the annular space 300 and into the discharge duct 100, as indicted by the flow arrows E in FIG. 15.

Thus, the residual pressurized fluid that is held captive downstream from the seat 47 in the chamber 44 and in the channel 42 after closure of the valve 200 and of the valve member 13 can be removed via the discharge duct 100. When the value of the pressure downstream from the seat 47 becomes less than a certain value, determined for the safety of the user, the spring 92 manages to push back the control ring 90, the locking members 82 and 84 disengage from the groove 17, and the male element B can be disengaged from the female element A.

By means of the positioning of the sleeves 60 and 78 and of the O-ring seal 20, an automatic flow control function is obtained for controlling the flow of the pressurized fluid towards the discharge duct 100, this automatic function not requiring any particular manipulation by a user because it can result, automatically, from the movements of the component parts of the coupling during the successive steps of coupling, of opening the valve 200, of closing the valve 200, and of de-coupling.

Figure 16:
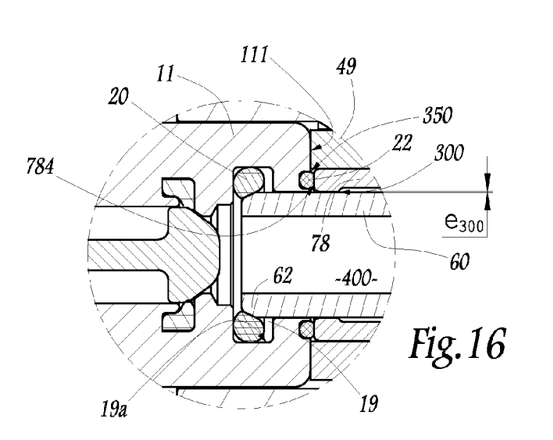
FIG. 16 is a view analogous to FIG. 11 for a second embodiment of a coupling of the invention.
Figure 17:
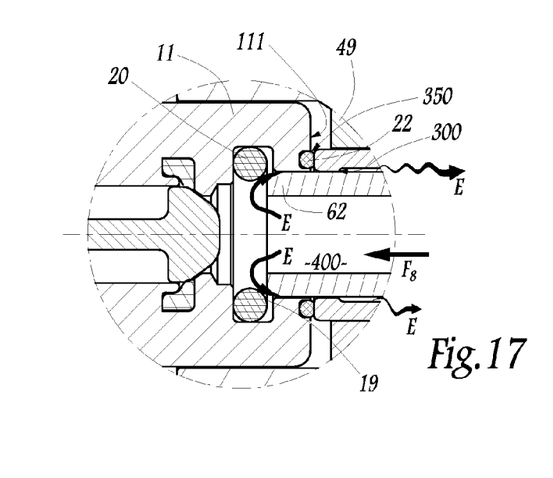
FIG. 17 is a view analogous to FIG. 15 for the coupling of FIG. 16.

In the second embodiment of the invention shown in FIGS. 16 and 17, elements analogous to the elements of the first embodiment bear like references.

In this embodiment, an O-ring seal 22 is interposed between the end face 784 of the sleeve 78 and the front edge 111 of the body 11. This O-ring seal 22 provides sealing at the interface 350 between the bodies 11 and 70. The inner sleeve 60 bears against the O-ring seal 20 while pressurized fluid is flowing through the coupling, as shown in FIG. 16. It then presses the seal 20 against the bottom 19a of the groove 19.

As shown in FIG. 17, after the valve of the coupling has been closed, and on decoupling the male and female elements of the coupling, the sleeve 78 is pushed back in the direction indicated by arrow $F_8$. The effect of this is to push the body 11 back in the same way so that the end 62 of the inner sleeve 60 is spaced apart from the O-ring seal 20, thereby leaving a passageway available for the flow E of residual pressurized fluid towards the discharge duct 100, through the annular space 300 defined between the outside surface of the end 62 of the inner sleeve 60 and the outside surface of the outer sleeve 78.

Figure 18:
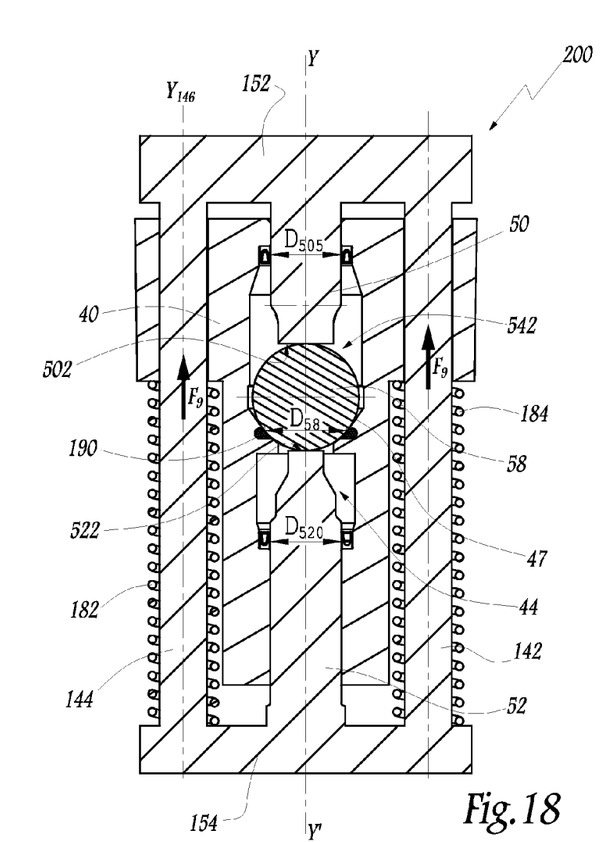
FIG. 18 is a section view comparable to FIG. 5, for a third embodiment of a coupling of the invention.

In the third embodiment of the invention, shown in FIG. 18, elements analogous to the elements of the first embodiment bear like references. The valve 200 of this embodiment has a first piston 50 and a second piston 52 between which a ball 58 is disposed along the axis Y-Y', which ball is suitable for coming to bear against a seat 47 formed by the main body 40 of the female element of the coupling and that is equipped with an O-ring seal 190. The pistons 50 and 52 co-operate with the ball 58 at their respective end surfaces 502 and 522. These contacts may be simultaneous or non-simultaneous. An annular space 542 is defined around the piston 50, and around the ball 58, upstream from the seal 47, while a flow chamber 44 is defined downstream from said seat. The chamber 44 is a portion of a flow duct 400 for enabling pressurized fluid to flow in the main body 40 of the female element of the coupling A. When the valve is in the closed configuration, the piston 50 comes to bear indirectly against the seat 47 via the ball 58 that the piston 50 pushes against said seat, by means of its end surface 502.

In order to open the valve, the piston 52, via its end surface 522, pushes the ball 58 so as to lift it off the seat 47.

In an optional aspect of the invention that is not shown, a resilient device may be interposed between the surface 502 of the piston 50 and the ball 58 so as to maintain contact between the piston 50 and the ball 58 despite the axial clearance between the piston 50 and the plate 152. As in the first embodiment, the pistons 50 and 52 are implemented by mechanical link means made up of two columns 142 and 144, and of two plates 152 and 154 that are disposed outside the flow duct 400 through which the pressurized fluid can flow.

In a closed configuration shown in FIG. 18, the ball 58 rests on the seat 47. The fluid present in the annular space 542 subjects the piston 50 and the ball 58 to compression stress only.

Two springs 182 and 184 exert a force on the equipment formed by the parts 50, 52, 142, 144, 152, and 154, which force urges the valve to re-close by default.

When the valve 200 is to be opened, action is taken on the columns 142 and 144 so as to exert thereon a force $F_9$ that is parallel to the axis Y-Y' along which the pistons move, in a direction in which the piston 50 is moved away from the seat 47. This force may be exerted by wheels such as the wheels 130 and 134 mentioned for the first embodiment, or by any other appropriate means (not shown).

In this embodiment, the sealing sections may also be slightly different, as mentioned for the first embodiment, so as to make closure secure and so as to facilitate opening. The diameter $D_{58}$ where the ball 58 is in contact with the seat 47, corresponding to the sealing section between the ball 58 and the seat 47 at the seal 190, is slightly greater than the diameter $D_{505}$ so as to limit the opening force exerted by the piston 52 on the ball 58.

The technical characteristics of the above-described embodiments may be combined within the ambit of the present invention.

The invention claimed is:

1. A female quick-connect coupling element for releasably joining together pipes for pressurized fluid, the female element for receiving an end-piece of a male element when a male element is inserted therein along a longitudinal axis of the female element, the female element comprising:
   at least one locking member for locking an end-piece of the male element therein when the male element is inserted within the female element;
   a fluid flow duct;
   a valve for controlling a flow of the fluid through the flow duct, which valve includes a movable piston element mounted to move relative to a valve seat between open and closed positions to open and close the valve;
   a discharge circuit for discharging the flow of the fluid within the flow duct downstream from the valve seat in a flow direction of the fluid flow; and
   a hollow end-piece for bearing against a seal carried by the male element when a male element is fitted into the female element, a portion of the flow duct extending through the end-piece; and
   the hollow end-piece including an inner sleeve and an outer sleeve that are coaxial and mounted to move axially relative to each other; and wherein the inner sleeve and the outer sleeve are each adapted to come into abutment against a seal carried by the male element when inserted into the female element; and a space defined between the inner and outer sleeves is in fluid communication with the discharge circuit.

2. The female quick-connect coupling element according to claim 1, wherein the space defined between the inner and outer sleeves opens out axially and onto a front of at least one of the sleeves into a circular volume which surrounds the longitudinal axis, which volume is in fluid communication with the flow duct.

3. The female quick-connect coupling according to claim 1, wherein:
   the inner sleeve is secured to a main body in which the valve seat is located;
   the outer sleeve is secured to an auxiliary body that is mounted to move axially relative to the main body.

4. The female quick-connect coupling element according to claim 3, including a transmission means for transmitting movement between a control lever mounted to move relative to the main body and an auxiliary body, to cause the auxiliary body to move relative to the main body, the lever being operable to cause the valve movable piston element to move from the open position to the closed position.

5. The female quick-connect coupling according to claim 1, wherein an abutment, constrained to move with a first sleeve chosen from one of the inner sleeve and the outer sleeve co-operates with a first cam that is stepped along the longitudinal axis of the female element, the first cam is constrained to move along the longitudinal axis of the female element with a second sleeve chosen from one of the inner sleeve and the outer sleeve and that is mounted to be slidable perpendicularly to the longitudinal axis of the female element, said first cam being movable by a lever hinged to the female element.

6. The female quick-connect coupling element according to claim 5, wherein the first cam is secured to a second cam in abutment against a roller secured to a control ring for controlling the at least one locking member that is mounted to move in a recess provided in a body of the female element, between a first position, in which the at least one locking member is disengaged from an end-piece of the male element when a male element is inserted into the female element, and a second position in which the at least one locking member projects from the recess so as to be engageable with an end-piece of the male element when a male element is inserted into the female element, and wherein the second cam is moved by the lever in a direction in which the second cam pushes the roller in a direction such that the control ring drives the at least one locking member from the first position to the second position of the at least one locking member.

7. The female quick-connect coupling element according to claim 1, wherein the end of the inner sleeve is beveled on the outside and has a frustoconical end surface, and wherein a value of a half-angle at a vertex of the frustoconical end surface lies in a range of between 10° to 40°.

8. The female quick-connect coupling element according to claim 1, wherein the end of the outer sleeve is beveled on the an outer and has a frustoconical end surface, and wherein a value of a half-angle at a vertex of the frustoconical surface lies in a range of 60° to 80°.

9. The female quick-connect coupling element according to claim 1, wherein a value of a half angle at a vertex of the frustoconical surface is preferably about 72°.

10. The female quick-connect coupling according to claim 1, wherein:
the inner sleeve is integral with a main body in which the valve seat is located;
the outer sleeve is integral with an auxiliary body that is mounted to move axially relative to the main body.

11. The female quick-connect coupling element according to claim 10, including a transmission means for transmitting movement between a control lever mounted to move relative to the main body and an auxiliary body, to cause the auxiliary body to move relative to the main body, the lever being operable to cause the valve movable piston element to move from the open position to the closed position.

12. The female quick-connect coupling element of claim 1 wherein a value of a half angle at a vertex of a frustoconical end surface is 25°.

13. A quick-connect coupling for releasably joining together pipes for pressurized fluid, the coupling comprising a male element and a female element, the female element receiving an end-piece of the male element when the male element is inserted therein along a longitudinal axis of the female element, the female element including:
at least one locking member for locking the end-piece of the male element therein when the male element is inserted within the female element;
a fluid flow duct;
a valve for controlling a flow of fluid through the flow duct which said valve includes a movable piston element mounted to move relative to a valve seat between open and closed positions;
a discharge circuit for discharging the fluid from the flow duct downstream from the valve seat in a flow direction of the fluid flow;
a hollow end-piece for bearing against a seal carried by the male element when the male element is inserted into the female element, a portion of the flow duct extending through the hollow end-piece; and
the hollow end-piece including an inner sleeve and an outer sleeve that are coaxial and mounted to move axially relative to each other; and wherein the inner sleeve and the outer sleeve abut against the seal carried by the male element when the male element is inserted into the female element; and a space defined between the inner and outer sleeves is in fluid communication with the discharge circuit.

14. The quick-connect coupling according to claim 13, wherein the male element includes an internal circumferential groove with the seal mounted in the groove, and wherein, when the male element and the female element are in a locked configuration, fitted one into the other, and with the valve movable piston element in the open position, the inner sleeve bears against the seal to prevent fluid from flowing from the fluid flow duct towards a discharge duct.

15. The quick-connect coupling according to claim 13, wherein when the male element and the female element are in a locked configuration, fitted one into the other, and with the valve movable piston element in the open position, the seal prevents the fluid from flowing from the flow duct towards the discharge circuit, and prevents the fluid from flowing towards an outlet of the male element and of the female element via an interface zone defined between the outer sleeve and a body of the male element.

16. The quick-connect coupling according to claim 13, wherein, when the male element and the female element are in a locked configuration, fitted one into the other, and with the valve piston element in the open position, the seal is in contact with an outside surface of the inner sleeve, with a front end of the outer sleeve, and with a bottom of a groove in the male element.

17. The quick-connect coupling according to claim 13, wherein when the male element and the female element are in a locked configuration, fitted one into the other, and in a purge configuration, after the valve movable piston element is in the closed position to prevent fluid flow through the valve, the seal prevents the fluid from flowing from the male element and the female element via an interface zone defined between the outer sleeve and a body of the male element, but does not prevent the fluid from flowing from the flow duct towards the discharge circuit.

18. The quick-connect coupling according to claim 13, wherein, between a locked configuration in which the male element and the female element are locked, fitted one into the other, and with the valve movable piston element in the open position, and a locked configuration in which the male element and the female element are locked, fitted one into the other, and in a purge configuration after the valve has been closed, the outer sleeve moves relative to the inner sleeve in an axial movement towards a front of the female element.

19. The quick-connect coupling according to claim 13, wherein, between an unlocked configuration in which the male element and the female element are not locked, but are fitted one into the other and with the valve movable piston element in the closed position, and a locked configuration in which the male element and the female element are locked, fitted one into the other and with the valve movable piston element in the open position, the outer sleeve moves relative to the inner sleeve in an axial movement towards a rear of the female element.

* * * * *